Dec. 21, 1937.   R. G. COATES   2,102,586
MOTOR CAR CONTROL MECHANISM
Filed Dec. 23, 1932   2 Sheets-Sheet 2

Inventor.
Ray G. Coates

Patented Dec. 21, 1937

2,102,586

UNITED STATES PATENT OFFICE 2,102,586

MOTOR CAR CONTROL MECHANISM

Ray G. Coates, Pasadena, Calif.

Application December 23, 1932, Serial No. 648,550

5 Claims. (Cl. 192—.01)

My invention belongs to that class of mechanism designed for motor car control and more particularly to the class using power to assist the operator in manipulating the controls. The great increase in speed of motor cars results in them traveling a long distance before the various controls come into action when an emergency stop is necessary. The time required to move the operator's foot from the accelerator pedal to the brake pedal represents over fifty feet of car travel at a speed of sixty miles per hour. There is also the danger that the foot may not succeed in catching the brake pedal in an emergency action.

The object of my invention is to reduce the time required to open the clutch and apply the brakes of motor cars.

A second object is to accomplish the above results with the least physical effort on the part of the operator.

Another object is to have the necessary operations of control to automatically occur in their proper sequence so that various acts of control will not interfere with each other.

Attempts have been made to accomplish the above results. Most of these attempts require an independent source of pressure to actuate the necessary auxiliary motors. Further, the normal position of the control member involves a different relation of the parts of the mechanism than occurs in my invention.

My invention normally maintains the engine clutched to the driving mechanism, yet allows the operator to free wheel intentionally; to speed up the engine or to slow it down; to open or close the clutch; to apply the brakes with partial or full pressure; all with easy and natural movements of the operator and without having to change from one control to another at the instant of an emergency. These advantages are obtained without interfering with the usual controls, which latter may be used at any time.

My invention is an improvement on Patent #1,887,231, dated November 8th, 1932 issued to me, in which patent the accelerator member controls the feeding of fuel to the engine and also the opening and closing of the clutch. In this present application the control of the brakes is added to the control of the fuel, thus placing under one member practically instantaneous power operation of all auxiliaries used in motor car control.

The accompanying drawings and description show a method of carrying out my invention. I do not limit myself to this particular method but contemplate using all constructions to which it may be applied.

The drawings show, diagrammatically, views of a method of carrying out my invention. Figure 1 is an elevation of the device as viewed from the left side of the car. In this view parts of several members are broken away to more clearly display members behind them. Parts are also in section where this will add to clearness. These sectional parts are self explanatory. The partial sectional views around axle 17 are on the line 1—1 of Figure 2.

Figure 1:
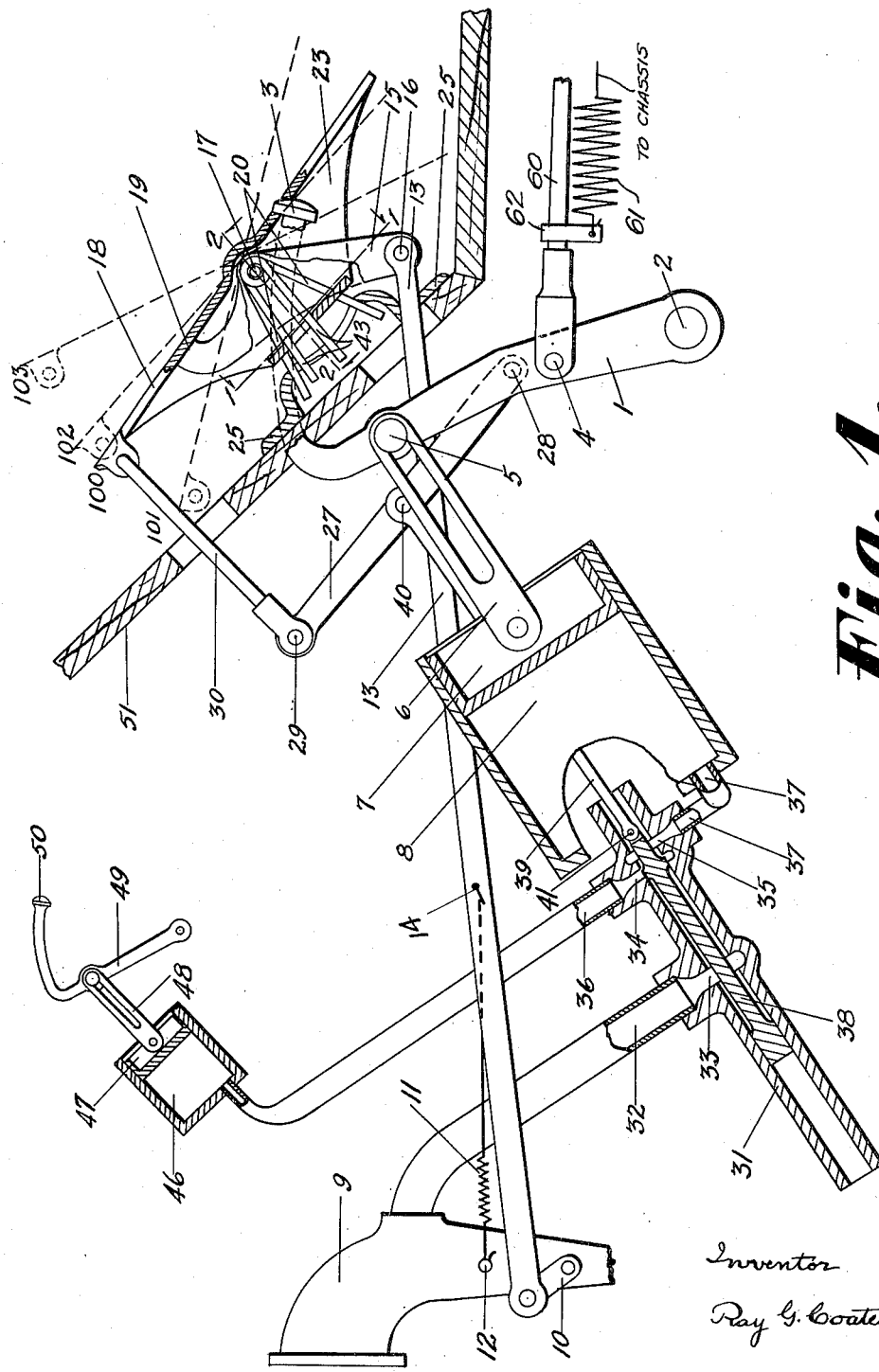

In the drawings I represents the pedal lever which commonly applies the brakes. It swings on the center 2 and carries the usual foot piece 3. It is partially broken away at the upper part in order to show the mechanism behind it. At 4 the brake rod 60 is connected, which rod conventionally represents the intermediate mechanism through which the movements of the brake lever I result in the brake shoes taking hold of the brake drums. As is usual the more the brake pedal lever is moved to the left the greater is the force applied to the brake drums. The pedal lever I may return to its normal released position by the reaction of the usual brake springs or by any appropriate method now practiced in this art. This is conventionally illustrated by the spring 61 attached at one end to the clamp 62 on the brake rod 60 and at the other end to the chassis, or its equivalent.

On the pedal lever I is a pin 5 carrying a link 6 which latter is pinned to the piston 7 in the common manner. Piston 7 freely traverses the cylinder 8 yet is air-tight so that a sufficient fall of pressure in cylinder 8 will cause the atmospheric pressure to move 7 towards the closed end of the cylinder, which latter is shown partly broken away in order to show the parts behind it. This movement carries the link 6 and pin 5 and pedal lever I along with it and causes an application of the brakes.

The intake of the engine is conventionally indicated by 9 and at 10 is, also conventionally indicated, the throttle valve controlling the application of fuel to the engine. The throttle valve is normally closed except for enough fuel to maintain the engine at "idling speed". This position of the valve is effected by the spring 11, one end of which is attached to the intake at 12, or to any other suitable place, and the other end to the throttle rod 13 at a point 14. The throttle rod 13 is connected to the throttle valve at one end and to the bell crank 15, at the other end, by the pin 16. The bell crank 15 is supported by and swings on the axle 17 and its upper end contacts with the member 18 at the point 19.

This member 18 is the control member of the power auxiliaries of the car. It is so supported on the axle 17 as to permit the left end to move through the arc 101 to 103. If the control member 18 is depressed at its left end it will contact with the bell crank 15 at the point 19 and 15 will then rotate around 17 and the throttle rod 13 will be carried to the right thereby opening throttle valve 10. Control member 18 is normally in position 100 and the throttle valve is closed except for enough fuel to maintain the engine "idling".

Figure 3:
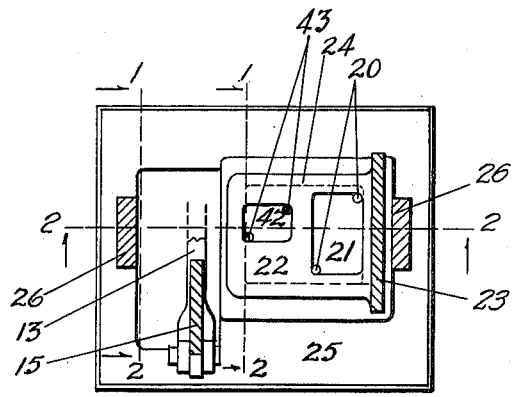
Figure 3 is a partial sectional view of Figure 2 in a plane parallel to its base and on the line 3—3 of Figure 2.
Figure 2:
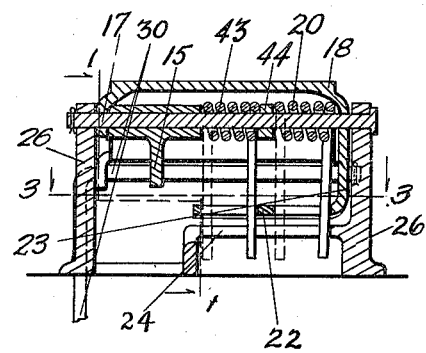
Figure 2 is a sectional view of the control member group taken through the center line of the member's axis on the line 2—2 of Figure 1.
Figure 4:
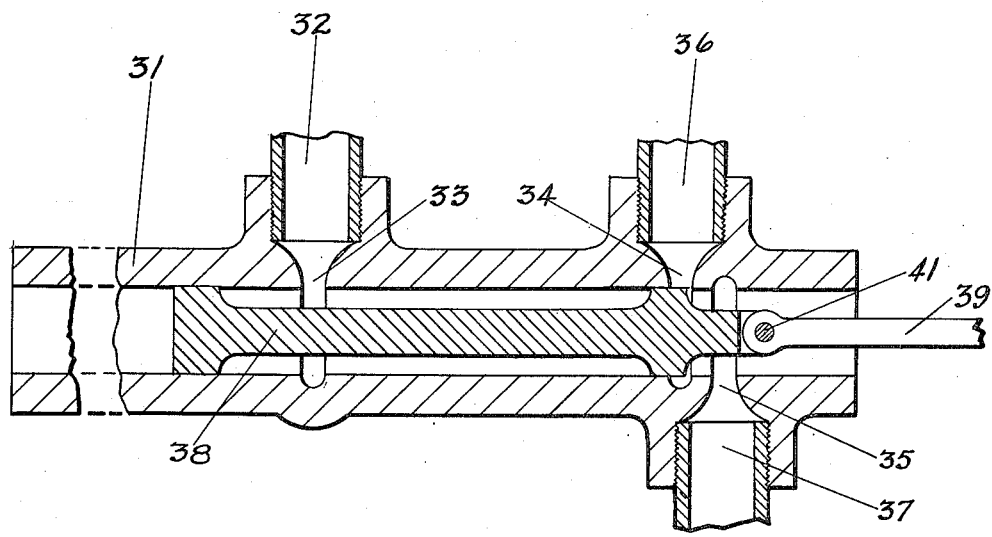
Figure 4 is an enlarged view of a part of the valve showing the port relations more clearly than in the other figures.

Around the axle 17 is a coiled spring 20 whose two ends project downwards through the opening 21 in the spring cage 22, which latter is rigidly atached to the fin 23 which forms one edge of the control member 18. The ends of spring 20 pass on into a rectangular opening 24 (shown dotted in Figure 3) in the base 25 which opening co-acts with cage 21 in restraining spring 20. The cages 21 and 24 are so proportioned that the spring 20, when assembled under initial stress, contacts near its ends with both 21 and 24. The stress on spring 20 thus ties 21 and 24 together until the pressure on control member 18 overcomes the initial stress on spring 20. If member 18 is moved either way from position 100 spring 20 is additionally stressed, and if said member is then released it will return to position 100 by the reaction of spring 20. Position 100 is the normal position of member 18. If member 18 is depressed at the left end throttle valve 10 opens and speeds up the engine. The range of movement of member 18 from position 100 to position 101 is sufficient to allow member 18 to assume various positions so as to feed fuel for various speeds of the engine.

Axle 17 is supported by columns 26 which latter are a part of the base 25, which base may be secured to the front floor boards 51 of the car. The duplex lever 27 is journaled on the pin 28. This pin 28, shown dotted in Figure 1 because it is on the far side of lever 1 in said figure, is integral with said lever, or is welded to it, or secured by other satisfactory means. The other end of 27 is journaled at 29 to the member 30 which connects 27 to the control member 18. Thus when control member 18 is moved duplex lever 27 also moves and in the same direction.

A valve body 31 is connected by the conduit 32 to the intake 9 at a point on the engine side of the throttle valve 10. Valve body 31 is provided with a port 33, a port 34, and a port 35. Port 33 is the point of connection of conduit 32 leading to intake 9. Port 34 is connected to conduit 36 and port 35 connects with cylinder 8 via conduit 37. Valve 38 is connected at 41 with the valve rod 39, the other end of this valve rod being connected to the duplex lever 27 by the pin 40, located about half way between the two ends of 27. In the position shown ports 34 and 35 are open to the atmosphere at the right hand end of the valve 38. The pressure in the valve body at port 33 is the same as that in the intake 9. If the control member 18 is depressed at its left end then the duplex lever 27 will swing around pin 28 as a center and this will move points 40 and 41 and attached valve 38 to the left, leaving the ports 34 and 35 still exposed to the atmospheric pressure, therefore in feeding fuel to the engine by control member 18 the valve 38 simply moves to the left without any effect on the members controlled by the ports 34 and 35. If control member 18 is released valve 38 returns to the position shown in Figure 1.

Spring cage 22 contains an opening 42 through which pass the two ends of an initially stressed coiled spring 43 also hung on the axle 17. A spacer 44 may also be placed on 17 to keep the springs 20 and 43 in their proper positions on the axle. The ends of spring 43 also extend well into the opening 24 which confines spring 20, heretofore mentioned. Opening 42 is smaller than opening 21 and it is so placed, as regards the restraining edges of 24, that the control member 18 must rise at the left end before an end of spring 43 comes in contact with said edges. If the left end of control member 18 is raised to position 102, one end of spring 43 will contact with the upper edge of opening 24 and the control member 18 will immediately offer a suddenly increased resistance to further movement in the same direction. To raise the left end of member 18 the right end is depressed.

When control member 18 moves from position 100 to position 102 it carries duplex lever 27 to the right and this moves valve 38 so as to open port 34 to the pressure in the intake 9. Conduit 36 leads from port 34 to cylinder 46 provided with the piston 47, which latter is operatively connected with the clutch pedal lever 49. Parts 46, 47, and 49 are shown conventionally. Thus when valve 38 opens port 34 to intake pressure, the pressure in cylinder 46 falls and the piston 47 retreats, thereby carrying the link 48 and clutch lever 49 to the left and opening the clutch. Since up to this point the brake lever 1 carrying the pin 28 has not moved, the actions of the control member 18, and its connected parts, between the positions 101 and 102 are equivalent to the actions of the parts of said Patent Number 1,887,231, on which this application is an improvement.

If control member 18 is moved, by further depression of its right hand end by the operator, towards position 103 then the duplex lever 27 will move valve 38 far enough to the right to open port 35 to the low pressure of the intake 9. This action causes the pressure to fall in the conduit 37 and the connected cylinder 8 and the piston 7 withdraws into the cylinder, carrying link 6 and brake lever 1 to the left, thereby applying pressure on the brakes through connection 4. The movement of brake lever 1 to the left also moves the pin 28 and duplex lever 27 in the same direction, thus moving point 40 and valve 38 to the left. This action cuts off the connection of cylinder 8 with the intake 9 so that less than the maximum force will be applied to the brakes. If the control member 18 is moved to the extreme position 103 then the return movement of point 28, of brake lever 1, will not be sufficient to cut off the connection of cylinder 8 with intake 9, therefore maximum pressure will be applied to the brakes.

A clutch should open promptly and not be allowed to drag, therefore the distance from position 100 to position 102 may be a short one arranged to furnish a prompt maximum force of the clutch opening mechanism without requirements for partial pressures in cylinder 46. This leaves the larger part of the arc of movement of control member 18 between positions 100 and 103 for controlling the partial pressure applications of the brakes. This arc between positions 102 and 103 is sufficiently long to provide varying positions of control member 18 so that the pressure in cylinder 8 can be "graded" as road conditions require. A small amount of lap given to the valve 38, after the methods practiced in this art for many years, will enable the pressure to be maintained in cylinder 8 as may be desired. It will be particularly noted that the brakes are set only after the clutch has been opened, and that they are released before the clutch can be closed. For emergency movements the right hand end of member 18 is depressed instantly to the limit and the sequence of operations occurs in the order required, viz. the pressure falls in the intake 9; the clutch opens; and the brakes are set, all almost instantaneously.

If control member 18 is released, after having been depressed at its right hand end by the operator, springs 20 and 43 jointly restore it to position 102 and then spring 20 alone moves it back to normal position at 100.

Whenever control member 18 moves from normal towards position 103 spring 20 resists this motion. This resistance is strong enough for the operator to notice yet one that the operator can easily overcome. The increased resistance of spring 43 is definite evidence that the clutch range of control pedal 18 is passed and that the brake range has been reached. Since both springs 20 and 43 are assembled under an initial stress the increase in resistance when they come into action is sufficiently marked to serve as a simple automatic indicator of the position of control member 18, yet a resistance that can be controlled by the amount of initial stress applied.

In use the operator exerts no pressure on control member 18, which normally assumes, with a prearranged initial stress on spring 20, a firm position at 100. In this position the engine is "idling" and the clutch is engaged. By pressing down the left end of member 18 fuel is fed to the engine and the latter speeds up. If the operator relaxes the pressure the member 18 returns again to position 100 and fuel is again shut off to "idling." If it is desired to "free wheel" the operator presses down the right hand end of member 18 until spring 43 is felt. The clutch is then open and the car is then running free from the engine. This is also the action for changing gears. The "free wheeling" is not automatic but is intentional. Intentional free wheeling is much safer than automatic free wheeling. If the operator relaxes pressure control member 18 again goes to position 100 and the clutch again engages. If, while the car is running with the clutch engaged, it is desired to slow down the speed of the car the operator presses down the right hand end of member 18 until position 102 has been passed. This first opens the clutch and then opens cylinder 8 to the low pressure in the intake 9 with a resulting application of the brakes with a force depending on the position of control member 18 in the arc 102 to 103. By simply pressing down either end of control member 18 the operator performs all of the work necessary for an instantaneous control of the speed of the car. There is no loss of time, as now, in moving the foot to the brake pedal, nor any danger, in an emergency, of failing to immediately locate the brake pedal.

Brake cylinder 8 with its piston 7 is shown in a position to pull at an advantageous angle on brake lever 1. Limitations of space adjacent the sloping floor boards of cars may necessitate placing cylinder 8 in some more roomy location, therefore it may be placed in another location and act on lever 1 in an indirect manner. Such a placing of the power cylinder of an auxiliary motor is illustrated in Patent #1,851,274, granted to me on March 29, 1932. When such a change in location becomes necessary conduit 37 will then be arranged to lead to cylinder 8 in its new location.

I claim:—

1. An intake; a throttle valve; a vacuum clutch-opening motor; a vacuum brake-setting motor; an operator controlled member yieldably maintained in a released position intermediate the ends of its path of movement, said released position involving the throttle valve closed to idling and the clutch-opening motor and the brake-setting motor inactive; a motor control device connected to said motors, to said member, and to said intake; means, connecting said member to said throttle valve, adapted to open said throttle valve when said member moves in one direction from said released position; means, connecting said member to said motor control device, adapted to start said clutch-opening motor when said member moves in the other direction from said released position and to start the brake-setting motor when said member passes beyond the clutch-opening position.

2. A throttle valve; a clutch-opening motor; a brake-setting motor; an operator controlled member maintained in a released position intermediate the ends of its path of movement by an initially stressed yieldable resistance but said member capable of being moved in opposite directions, said released position involving the throttle valve closed to idling and the clutch-opening and the brake-setting motors inactive; a second initially stressed yieldable resistance adapted to resist movement of said member when said member passes beyond the position governing the activity of the clutch-opening motor.

3. An intake; a vacuum clutch-opening motor; a vacuum brake-setting motor; a valve body with ports connected by conduits to said intake, to said clutch-opening motor, and to said brake-setting motor; a valve controlling said ports; an operator controlled member yieldably maintained in a normal position and fulcrumed intermediate of its ends; means to connect said valve to said member, said means adapted to maintain said clutch-opening motor and said brake-setting motor inactive when said control member is in normal position and to start said clutch-opening motor before starting said brake-setting motor when said member is moved to one side of said normal position.

4. An intake; a throttle valve; a vacuum clutch-opening motor; a vacuum brake-setting motor; a brake actuating mechanism; an operator controlled member yieldably maintained in a normal position, said normal position involving the throttle valve closed to idling, and said clutch-opening motor and said brake-setting motor inactive; means, connecting said member to said throttle valve, adapted to open said throttle valve when said member is moved in one direction from said normal position; a motor control device connected to said intake, to said clutch-opening motor and to said brake-setting motor; means, connecting said motor control device to said member and to said brake actuating mechanism, adapted to start said clutch-opening motor when said member is moved in the other direction from said normal position and adapted to start said brake-setting motor to act with increasing stress on said brake actuating mechanism as said member moves in said other direction with increasing distance from the clutch-opening range.

5. In a motor car, the combination of an intake; a throttle valve; a vacuum clutch-opening motor adapted to effect its purpose simultaneously with a fall of pressure in said motor; a vacuum brake-setting motor adapted to effect its purpose simultaneously with a fall of pressure in said motor; a device, adapted to control the pressures in said motors, connected to said motors and to said intake; and a manually controlled member journaled intermediately of its ends, operatively connected to said device and to said throttle valve, adapted to control said device and said throttle.

RAY G. COATES.